April 25, 1939.  W. M. MOUNT  2,156,123
APPARATUS FOR DEMULSIFYING AND SETTLING LIQUIDS
Filed March 18, 1938  2 Sheets-Sheet 1

Inventor:
Walter M. Mount,

April 25, 1939.  W. M. MOUNT  2,156,123
APPARATUS FOR DEMULSIFYING AND SETTLING LIQUIDS
Filed March 18, 1938   2 Sheets-Sheet 2

Inventor:
Walter M. Mount,
By Wilkinson Huxley Byron & Knight
Attys.

Patented Apr. 25, 1939

2,156,123

UNITED STATES PATENT OFFICE 2,156,123

APPARATUS FOR DEMULSIFYING AND SETTLING LIQUIDS

Walter M. Mount, Tulsa, Okla.

Application March 18, 1938, Serial No. 196,649

9 Claims. (Cl. 210—59)

The invention relates to a method of and apparatus for demulsifying and settling liquids and has more particular reference to apparatus for removing excess free water and sediment from crude oil and similar liquids and which will also demulsify the oil by breaking down the water-oil emulsions.

Before crude oil, that is, oil as it is taken from the wells, can be delivered to pipe lines which transport the oil to distant parts it is necessary to clarify the oil so that its content of water, emulsions and sediment does not exceed approximately one and one-half per cent. This requires intensive clarification and demulsification of the crude oil. For breaking down the emulsions it is necessary to heat the oil which has generally been done in an open tank at some distance from the well. The water-oil emulsions may be considered a mixture of liquids of different specific gravities. The heat facilities the separation of one liquid from the other since the liquid of less specific gravity will expand at a greater rate than the liquid of greater specific gravity. As regards water-oil emulsions the oil if of less specific gravity than the water and therefore upon the application of heat the oil will rise, leaving the water to settle together with the solids and other sediment.

The most serious objection to apparatus heretofore used for demulsifying and settling crude oil has been the inefficient use made of the heat added to the oil and its uneven distribution throughout the mass being treated. The present apparatus is highly efficient in this respect since all operations, namely, the heating, demulsifying of the oil and its clarification are performed in one container. The present apparatus essentially consists of a closed tank having an inlet for the oil at the bottom and an outlet at the top. The inlet discharges the crude oil into a vertical heating chamber through which the oil flows in an upward direction to be discharged at the top into a plurality of clarifying chambers. In these chambers the heated oil flows downwardly, then upwardly into a clarifying zone and finally downwardly to be discharged from the flaring open end of the chamber. During travel through these clarifying chambers the maximum demulsification and clarification of the oil is effected. The comparatively clean and emulsion-free oil from the clarifying chambers flows into and substantially fills the tank and thus this oil completely surrounds each clarifying unit and the central heating unit.

The central location of the heating unit is advantageous for uniformly distributing the heat throughout the oil in the tank. It is also to be noted that the heat given off at various heights of the heating unit decreases upwardly, whereas, the amount of heat given off by the clarifying units decreases downwardly. Thus the oil undergoing treatment is maintained at a fairly even temperature which greatly aids in breaking down the water-oil emulsions and in settling out the water and sediment from the oil.

It is another object of the invention to design the present equipment including the heating unit and clarifying chambers so that the oil or other liquid being treated will flow at a gradually decreasing velocity from the heating unit to the outlet of the tank. In the present apparatus the velocity of flow is at a maximum in the heating unit, and since the clarifying chambers have a cross sectional area many times that of the heating unit a material reduction in the speed of flow will take place in these chambers. This is of special importance since this action promotes clarification. The oil from the clarifying chambers flows upwardly in the tank and here again the cross sectional area is many times that of the clarifying chambers. This gradual decrease in the velocity of flow, and which is in an upward direction, further aids in the removal of the water and sediment from the oil.

A further object of the invention resides in the provision of equipment in the clarifying chambers which will operate on the counterflow principle to produce clarification of the liquid. As previously stated, the liquid in the clarifying chamber is first caused to flow downwardly and then upwardly into a clarifying zone. The equipment above referred to promotes this upward flow and which takes place at a gradually decreasing velocity, whereas, the heavy liquids, sediment and foreign matter are caused to flow downwardly or counter thereto toward a discharge outlet. When the upward flow diminishes gradually, as in the present apparatus, the finer particles tend to rise to a point where the upward flow of liquid is just counterbalanced by their tendency to fall. These particles, therefore, tend to form in layers segregated according to size and density. The layers of fine particles form an excellent filter for the rising dispersion medium. The agglomerating tendency of the particles reaches a maximum when they are in such a quiescent state of suspension and many finer particles tending to rise through these quiescent layers are agglomerated with the particles which are in suitable suspension. This forms larger particles which thus become flocculated and are caused to flow downwardly toward the sludge discharge.

With these and other objects in view the invention may consist of certain novel features of construction and operation, as will be more fully described and particularly pointed out in this specification, drawings and claims appended hereto.

In the drawings which illustrate an embodiment of the invention and wherein like reference characters are used to designate like parts—

Figure 1:
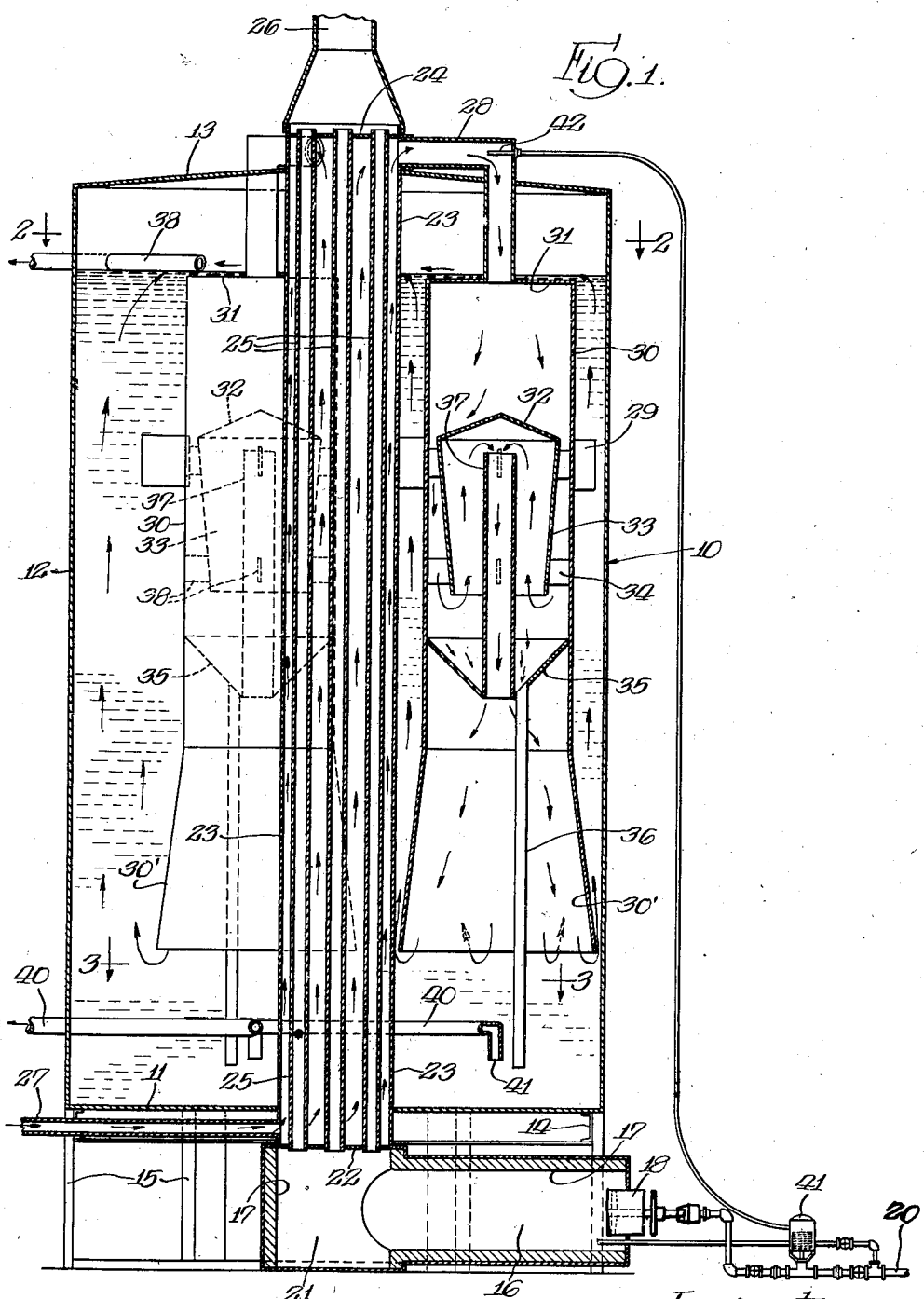
Figure 1 is a vertical cross sectional view showing apparatus for demulsifying and settling liquids constructed in accordance with the invention.
Figure 2:
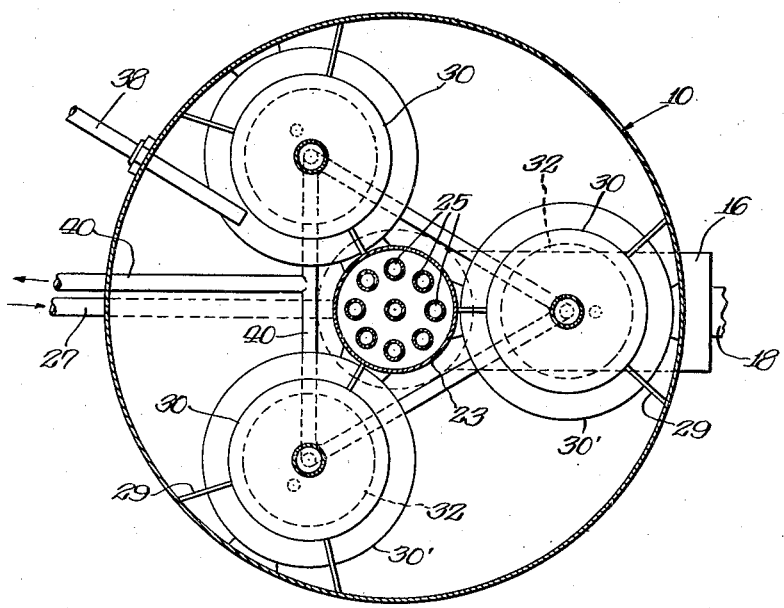
Figure 2 is a transverse sectional view taken substantially along line 2—2 of Figure 1 and showing the spacing of the clarifying chambers and their location with respect to the heating unit.
Figure 3:
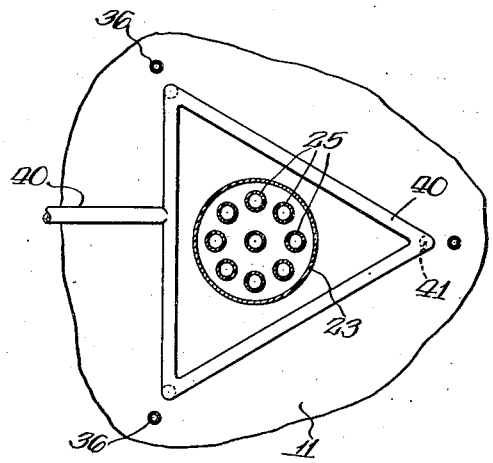
Figure 3 is a fragmentary sectional view taken substantially along line 3—3 of Figure 1.

In the embodiment of the invention disclosed in the drawings, the numeral 10 indicates the cylindrical tank or container within which the several units, namely, the heating and clarifying units, are located. The tank 10 having the base 11, side walls 12 and top 13 is suitably supported by the structural steel base comprising the horizontal channel members 14 and uprights 15. The steel base structure is provided with a combustion chamber designated by numeral 16 which is suitably lined with refractory material such as 17. The burner 18, positioned in the front end of said chamber, provides the main heating unit for heating the oil to be treated, as will be presently described. The burner is supplied with fuel by the pipe 20. An important application of the present equipment is in demulsifying and clarifying crude oil which requires heating of the oil. A certain amount of gas is always produced in the heating of crude oil and the present invention contemplates that the gas thus produced will be supplied to the burner 18 and will therefore provide the main source of fuel for operating the equipment.

The rear end of the combustion chamber 18 has communication with the fire box 21, also suitably lined with refractory material 17. The top of the fire box, namely 22, provides the base for the heating unit formed by the cylindrical walls 23 and which extends vertically of the tank 10, projecting a short distance beyond the top 13 of the tank. At its upper end the heating unit is closed by the top member 24. Extending vertically within the heating unit 23 and for the entire length thereof are a plurality of fire tubes 25, said tubes extending through and depending a short distance below the base 22 and also extending through and projecting a short distance above the top member 24. The products of combustion and the burning gases from the chamber 16, which are at a high temperature, enter the fire box 21 and are thereupon delivered to the fire tubes 25, being expelled from said tubes at the top thereof into the chimney 26. The inlet 27 for the liquid to be treated has connection with the heating unit 23 at the base thereof and accordingly said liquid immediately comes into contact with the fire tubes 25. The lower portion of the fire tubes is maintained at a high temperature by the burning gases flowing therethrough and the liquid, as the same flows upwardly in the heating unit, is thereby raised to a relatively high temperature. The arrangement of fire tubes with liquid completely surrounding the tubes is very efficient in transferring heat to the liquid. The height of the heating unit is another factor insuring heating of the oil or other liquid to be treated to the highest temperature possible for the amount of heat produced by the burner 18. It will be observed that the heating unit extends for the length of the tank 10 and that the fire tubes 25 extend the full length of said unit.

The outlets 28 have connection with the heating unit at the extreme upper end thereof and which in the modification of the invention shown in the drawings is above the top of the tank 13. The heated oil or other liquid from the heating unit 23 is delivered by the outlets 28 to a plurality of clarifying units formed by the cylindrical walls 30. The clarifying units are located within the tank 10 and are radially arranged with respect to the heating unit, which is centrally disposed within said tank. Three clarifying units are disclosed in the drawings but the invention is not to be limited to any number as obviously more clarifying units or less than the number shown may be employed with equal efficiency. In accordance with the invention each clarifying unit 30 is provided with a closed top 31 and an open flaring bottom 30'. Members in the form of struts 29 suitably secure the clarifying units to the walls of the tank 10. The cross sectional area of each clarifying unit is greater than the cross sectional area of the heating unit. The liquid after entering the clarifying unit will therefore flow at a reduced velocity and this reduction in velocity is further increased by increasing the number of clarifying units. For example, three clarifying units are shown, and accordingly, the capacity of the clarifying units based on their cross sectional area is many times that of the heating unit.

The reduction in velocity in the flow of the liquid through the clarifying units is desired since these units are provided with clarifying apparatus and a relatively slow movement of the liquid promotes clarification. As best illustrated in Figure 1, each clarifying unit is provided with a tray 32 of somewhat conical shape provided with a peripheral depending flange 33. The said depending flange and its tray is suitably supported within the clarifying unit by braces 34. Below the peripheral flange 33 each clarifying unit is provided with a partition 35 of inverted cone shape. Said partition forms a sludge basin for the clarifying tray and is provided with one or more sludge draw-off pipes 36 extending vertically downward to within a short distance of the base 11 of the tank. Each sludge basin is also provided with a central stand-pipe 37 extending vertically upward from the said basin and terminating a short distance from the tray 32. Said standpipe forms a clear liquor outlet for the clarifying zone formed by the tray 32 and the peripheral depending flange 33 thereof. The liquid is first caused to flow downwardly in the clarifying unit 30 to below the peripheral flange 33. The clear liquid will continue its flow upwardly to the clear liquor outlet 37. This outlet discharges the liquid into the flaring open end of its clarifying unit 30. As shown in the drawings, the clarifying units communicate with the interior of the tank and accordingly the liquid therefrom is discharged into the tank.

Referring again to the peripheral flange 33, it will be noted that said flange converges inwardly toward its base to form a discharge passage with the cylindrical wall of the clarifying unit of gradually increasing cross sectional area downwardly. It will also be noted that the chamber formed by the tray and said depending flange increases in cross sectional area in a direction upwardly. As a result of this design the velocity of flow of the liquids and solids decreases both in the discharge passageway as well as in the clarifying chamber. The result obtained is a higher total clarifying capacity for a given volume tank. Since the object is to decrease the velocity of flow from the discharge passage to the clear liquid outlet, it is obvious that a peripheral discharge passage is preferred over a central discharge passage. The increase in the cross sectional area of the discharge passage in a downward direction to the decrease in the velocity of the liquid flowing through said passage effectively eliminates the settling or collection of the solids on the depending flange. Therefore the passage is at all times open and the travel of the liquids and other foreign particles to the sludge basin is facilitated. The upward flow of the liquid within the depending flange 33 is also at a gradually decreasing rate so that the particles are thereby precipitated and even the finer particles are filtered from the liquid so that only clarified liquid reaches the outlet formed by the standpipe 37.

The action of the clarifying tray in clarifying the liquid as above described is also highly efficient for breaking down emulsions such as the water-oil emulsions in crude oil. As described this breaking down of the emulsions requires the application of heat to the liquid since heat facilitates the separation of one liquid from the other. The oil has a liquid of less specific gravity and therefore will rise and flow into the clarifying chamber. During this movement of the oil intensive demulsification thereof takes place since the tendency of the water is to settle. The settling out of the water is further aided by the fine particles in suspension in the liquid at the entrance of the clarifying chamber. There is a tendency for these fine particles to form in layers segregated according to size and density and these layers form an excellent filter for the rising dispersion medium. The settling of the water, solids and other sludge is toward the sludge basin 35 and the same is removed by one or more sludge draw-offs 36.

A material reduction in the flow of the clear liquid downwardly from the end of the standpipe 37 is obtained due to the fact that the quantity of liquid has been reduced by the removal of the water, sludge or other foreign particles therefrom. This flow of the clear liquid is further gradually reduced as a result of the flaring open end of the clarifying units. From the clarifying unit the clear liquid is discharged into the tank, the effective cross sectional area of which is many times greater than the combined cross sectional area of the clarifying units. This is in keeping with the invention which contemplates the gradual reduction in the velocity of flow of the liquid from the heating unit to the clear liquid outlet 38 located in the upper portion of the tank. The flow of the liquid in the tank 10 is therefore in an upward direction and this direction of flow, as previously described with respect to the clarifying chamber, promotes settling of the sediment to the bottom of the tank and the breaking down of any emulsions remaining in the liquid.

A water and sediment draw-off 40 is located in the bottom portion of the tank 10, the same having an inlet 41 located under each of the clarifying units 30. The flow of the water, sludge and sediment and other matter accumulating in the bottom of the tank is thus localized with respect to each of the clarifying units. A sludge pump may be provided although usually the water, sediment and other matter will flow by gravity through the draw-off 40.

For regulating the operation of the burner 18 thermostatic control means such as 41 may be provided and which in turn is actuated in response to the temperature of the liquid flowing through the outlets 28 by means of the bulb 42 located therein. The central locating of the heating unit within the tank 10 is advantageous for uniformly distributing the heat throughout the mass of oil in the tank. The amount of heat given off at various heights of the heating unit decreases upwardly but this is offset by the heat given off by the clarifying units which decreases downwardly. In this manner the oil is maintained at a comparatively even temperature from the time it enters the clarifying units until it reaches the liquid draw-off 38 in the upper portion of the tank. This even distribution of the heat throughout the mass of oil being treated greatly aids in breaking down the emulsions and settling the foreign particles from the oil.

In the present apparatus all operations, that is, the heating, clarifying and demulsifying of the liquid, are performed within one container and accordingly less heat will be required to secure the desired results. The invention contemplates using the gas produced as a result of the heating for operating the burner. Since less fuel will be required to operate the present apparatus, as a result of its high efficiency, it is believed that the gas secured from said apparatus will be sufficient for operating the burner.

What is claimed is:

1. Apparatus for demulsifying and clarifying liquids comprising a cylindrical tank, a heating chamber for the liquid extending vertically of the tank and having an inlet at its base, at least one clarifying member also extending vertically within the tank and connecting at its upper end with the heating chamber, said clarifying chamber having an open bottom whereby the liquid flows upwardly in the heating chamber and downwardly in the clarifying chamber to be discharged within the tank, means within the clarifying chamber for separating sludge and other foreign matter from the liquid by reversing the direction of flow intermediate the ends of the chamber to establish a zone of upward flow, an outlet for the clear liquid in the upper portion of the tank, and a sludge draw-off in the base of the tank.

2. The combination set forth in claim 1 wherein the heating chamber is centrally located in the tank so that the heat given off thereby will be distributed throughout the mass of oil in the tank.

3. The combination set forth in claim 1 wherein the cross sectional area of the path of flow of said liquid generally increases from the heating chamber to the liquid outlet so that the velocity of flow of the liquid decreases toward the said liquid outlet.

4. Apparatus for demulsifying and clarifying liquids comprising a cylindrical tank, a heating chamber for the liquid extending vertically of the tank and having an inlet at its base, at least one clarifying chamber also extending vertically within the tank and connecting at its upper end with the inlet chamber, said clarifying chamber having an open bottom whereby the liquid flows upwardly in the heating chamber and downwardly in the clarifying chamber to be discharged within the tank, fire tubes within said heating chamber for heating the liquid flowing therethrough, means within the clarifying chamber for separating the sludge and other foreign matter from the liquid by reversing the direction of flow intermediate the ends of the chamber to establish a zone of upward flow, an outlet for the clear liquid in the upper portion of the tank, and a sludge draw-off in the base of the tank.

5. Apparatus for demulsifying and clarifying liquids comprising a cylindrical tank, a heating chamber for the liquid extending vertically of the tank and having an inlet at its base, at least one clarifying chamber also extending vertically within the tank and connecting at its upper end with the inlet chamber, said clarifying chamber having an open bottom whereby the liquid flows upwardly in the heating chamber and downwardly in the clarifying chamber to be discharged within the tank, a partition in the clarifying chamber forming a sludge basin, a tray having a peripheral depending flange located above the sludge basin and providing an inner clarifying zone, means extending from the upper portion of said clarifying zone through the said partition for discharging the clear liquid below the same, an outlet for the clear liquid in the upper end of the tank, and a sludge draw-off in the base of the tank.

6. Appraatus for demulsifying and clarifying liquids comprising a tank, a heating unit for the liquid extending vertically of the tank, clarifying units also extending vertically within the tank and having an open bottom, means joining the upper end of each clarifying unit with the upper end of the heating unit, a partition within each clarifying unit forming a sludge basin, a tray having a peripheral depending flange located above the sludge basin and providing an inner clarifying zone, a clear liquid draw-off extending from the upper portion of said clarifying zone through the said partition for discharging the clear liquid below the same, means depending from each partition for discharging the sludge and other foreign matter collected by the sludge basin into the lower portion of the tank, a sludge draw-off in the base of the tank, and a clear liquid outlet in the upper end of the tank.

7. The combination set forth in claim 6 wherein said heating unit is centrally located in the tank and said clarifying units are radially arranged with respect thereto.

8. Apparatus for demulsifying and clarifying liquids comprising a tank, cylindrical means extending vertically within the tank and providing a clarifying chamber, said means having an inlet for the liquid at its upper end and having an open bottom, whereby the liquid flows downwardly within the clarifying chamber to be discharged within the tank, a partition located within the cylindrical means intermediate the ends thereof providing a sludge basin, a tray having a peripheral depending flange located above the sludge basin and forming an inner clarifying zone, said depending flange forming with the walls of the cylindrical means an annular discharge path, a clear liquid draw-off extending from the upper portion of said clarifying zone through the said partition for discharging the clear liquid below the same into the lower portion of the clarifying chamber, means depending from said partition and extending through the lower portion of the clarifying chamber for discharging the sludge and other foreign matter collected by the sludge basin into the lower portion of the tank, a sludge draw-off in the base of the tank, and a clear liquid outlet in the upper end of the tank.

9. In the demulsification of liquids, the process which comprises introducing the liquid to be treated into a tank and producing an upward flow thereof in a definite path, adding heat to said liquid while flowing upwardly in said path, conducting the heated liquid to produce a downward flow thereof in a definite path, separating the sludge and other foreign matter from the liquid by reversing the flow at one point intermediate said downward path to establish a zone of upward flow, discharging the clear liquid at the bottom of said downward path within the tank, drawing off the separated sludge and other foreign matter, and withdrawing the clear liquid from the tank at the upper end thereof.

WALTER M. MOUNT.